United States Patent
Oz et al.

(10) Patent No.: US 8,185,926 B1
(45) Date of Patent: May 22, 2012

(54) SYSTEM AND METHOD FOR PROVIDING MEDIA STREAM RELATED APPLICATIONS

(75) Inventors: Ran M. Oz, Modiin (IL); Amir Hirschhorn, Tel Aviv (IL)

(73) Assignee: ARRIS Group, Inc., Suwanee, GA (US)

( * ) Notice: Subject to any disclaimer, the term of this patent is extended or adjusted under 35 U.S.C. 154(b) by 1177 days.

(21) Appl. No.: 10/698,189

(22) Filed: Oct. 30, 2003

Related U.S. Application Data

(63) Continuation of application No. 10/379,335, filed on Mar. 3, 2003, now abandoned.

(60) Provisional application No. 60/362,344, filed on Mar. 6, 2002, provisional application No. 60/366,219, filed on Mar. 20, 2002.

(51) Int. Cl.
*H04N 7/18* (2006.01)
*H04N 7/173* (2011.01)

(52) U.S. Cl. .......................... 725/88; 725/102

(58) Field of Classification Search ............... 725/88
See application file for complete search history.

(56) References Cited

U.S. PATENT DOCUMENTS

| | | | | |
|---|---|---|---|---|
| 5,625,864 A * | 4/1997 | Budow et al. | ............ | 725/82 |
| 5,864,682 A * | 1/1999 | Porter et al. | ............ | 709/247 |
| 5,900,904 A * | 5/1999 | Okada et al. | ............ | 725/92 |
| 6,032,180 A * | 2/2000 | Nishikawa | ............ | 725/115 |
| 6,065,050 A * | 5/2000 | DeMoney | ............ | 709/219 |
| 6,119,154 A * | 9/2000 | Weaver et al. | ............ | 709/219 |
| 6,741,290 B1 * | 5/2004 | Wells | ............ | 348/512 |
| 6,954,469 B1 * | 10/2005 | Dygert | ............ | 370/477 |
| 7,024,678 B2 * | 4/2006 | Gordon et al. | ............ | 725/88 |
| 2003/0093802 A1 * | 5/2003 | Cho et al. | ............ | 725/90 |
| 2003/0161302 A1 * | 8/2003 | Zimmermann et al. | ............ | 370/363 |
| 2003/0163824 A1 * | 8/2003 | Gordon et al. | ............ | 725/90 |

* cited by examiner

*Primary Examiner* — Brian Pendleton
*Assistant Examiner* — Jean D Saint Cyr
(74) *Attorney, Agent, or Firm* — Reches Patents

(57) ABSTRACT

The invention provides a system and method for providing media streams, the method include the steps of: receiving live media streams at a first path; providing a live media stream from the first path to a client, in response to a request to provide the live media stream to the client; and retrieving media related information and providing a non-live media stream from a second path to a client, in response to a request to provide the live media stream to the client.

26 Claims, 8 Drawing Sheets

Method 400

Method 500

SYSTEM AND METHOD FOR PROVIDING MEDIA STREAM RELATED APPLICATIONS

The present patent application is a Continuation of application Ser. No. 10/379,335, filed Mar. 3, 2003 now abandoned.

This application claims the benefit of U.S. provisional application Ser. No. 60/362,344 Filed Mar. 6, 2002; titled "System and method for providing Trick Modes", and claims the priority of U.S. provisional application Ser. No. 60/366,219 Filed Mar. 20, 2002, titled "System and Method for Providing Live Media Streams and Trick Modes".

FIELD OF THE INVENTION

The invention relates to a system and method for providing media streams such as trick modes and live media streams and especially to a memory efficient system and method.

BACKGROUND

Video Cassette Recorders allow an end user to record an audio-visual program. When reviewing the recoded program the viewer may perform various operations such as fast forward (FF), fast reverse (REW), play (PLAY), slow motion (SM), slow reverse and pause (PAUSE).

Video on demand (VOD) systems are based upon a provision of programs to viewers over communication networks such as Hybrid Fiber Coax (HFC) networks. VOD providers are requested to allow end users to implement trick modes such as fast-forward, rewind and the like. Due to various control, bandwidth and additional constraints VOD do not really perform FF, REW but display a subset of frames out of the program to emulate a FF and REW mode.

End users may also purchase a Personal Video Recorder (PVR) device that allows them to store a program in MPEG format, thus defining a stored program. The stored program may be manipulated to provide FF and REW modes. This solution is costly as it either requires dedicated hardware and/or a subscription fee and also allows the end user to skip commercials. Accordingly, operators want to implement a PVR-like solution at their plant.

MPEG defines various methods for compressing and transmitting audio-visual information according to predefined timing schemes that allow displaying audio visual content embedded within media streams. Raw video streams are provided to an MPEG encoder. An array of 8×8 pixels are DCT transformed to a block of 8×8 DCT coefficient blocks. The DCT coefficient blocks are assembled to macroblocks. The macroblocks are assembled to slices, that represent a horizontal strip of a picture. The strips are combined to make a picture. Each picture has a header. The picture header includes a picture type information, indicating whether the picture is I-frame, P-frame or B-frame. Pictures are arranged at Group of Pictures (GOPs). A sequence of GOPS forms a video elementary stream. Video and audio elementary streams may be multiplexed to provide a transport stream or a program stream. In Transport streams, the elementary streams are packetized to PES packets. Each PES packet includes a header that includes a stream ID and timing information. The PES header also includes timing information such as PTS and DTS that define when the pictures are to be available to a viewer and when pictures are to be provided to a decoder, prior to said presentation I-frames are independent in the sense that they include the entire information that is required for displaying a picture. A P-frame is decoded in response to information embedded within a previous frame, while a B-frames is decoded in response to information embedded within both a preceding and succeeding frame.

U.S. Pat. No. 6,065,050 of DeMoney suggests a system and method for indexing between various video streams that include trick play streams and normal play media streams in a video delivery system. These various streams were encoded in accordance to different presentation rates. The system generates index look up tables between the normal play media stream and the trick play streams. The table enables indexing between the streams by utilizing a normal play time standard, and associating normal play time values to offsets within the corresponding video streams. The normal play time standard is driven from the timing information of the normal play media stream. In response to a user instruction to PLAY, FF or REW the video stream, the system switches between normal play media stream and the corresponding trick play streams at predefined points that share the same normal play time value. The predefined points are stored at the look up table. U.S. Pat. No. 6,065,050 of DeMoney is incorporated herein by reference.

A disadvantage of some prior art methods results from the need to generate and store multiple streams for allowing trick modes.

The provision of both live media streams and trick play modes from data servers or media servers may impose a heavy burden upon the server and/or the network or link that connects the server to clients. This may require to dramatically increase the capabilities (and according increase the cost) of the said servers, communication link or network.

There is a need to provide a system and method that allows an efficient provision of live media to end users, as well as allowing an end user to implement trick modes such as fast forward, rewind and the like.

There is a need to provide a system and method for allowing efficient retrieval and storage of media streams and for allowing the retrieval and transmission of media streams according to predefined timing schemes to ensure the proper display of the audio-visual content embedded within media streams.

There is need to provide a system and method for allowing a service provider to provide FF, REW, PAUSE, SM services to an end-user, as well as live media streams. Thus an end user that is coupled to the service provider's facilities may perform various operations such as fast forward (FF), fast reverse (REW) and play (PLAY) and may also receive live streams.

SUMMARY OF THE INVENTION

The invention provides a system for providing media streams, the system includes: (i) a first path for receiving live media streams and for providing a live media stream to a client, in response to a request to provide the live media stream to the client; and (ii) a second path operable to retrieve media related information and provide a non-live media stream to a client, in response to a request to provide the non-live media stream to the client.

The invention provides a method for providing media streams, the method includes the steps of: (i) receiving live media streams at a first path; (ii) providing a live media stream from the first path to a client, in response to a request to provide the live media stream to the client; and (iii) retrieving media related information and providing a non-live media stream from a second path to a client, in response to a request to provide the live media stream to the client. The first path may include a data acquisition unit, a video pump interface and a video pump, while the second path may include a media server, a video pump interface and a media pump being connected to each other by a bandwidth limited link or links.

The invention provides a system that includes (i) an acquisition unit coupled to a media source, such as but not limited to a satellite receiver; (ii) a media storage and management entity such as but not limited to a server, (iii) a video pump interface, coupled to the output of the acquisition unit, to the server and to a command channel, the video pump interface is operable to receive instructions/requests from an end-user and accordingly to determine whether to feed the video pump with live stream media from the acquisition unit or to initiate a data fetch sequence for fetching data stored in the server, in case where trick modes are required; (iv) a video pump that is operable to determine which data to fetch from the server and when to transmit it according to MPEG timing. It is also able to fetch selected portions of the data stored at the server such as to emulate trick modes, and is further operable to transmit the retrieved data over a network to the end-user. The video pump can also transmit the live video that it receives directly from the acquisition unit. The acquisition unit is connected to the server for providing live media streams, while the server and the video pump interface may be connected via a network. The video pump interface allows for off loading the data network.

According to another aspect of the invention the video pump interface is further operable to receive an indication of the load of the network connecting between the server and the video pump interface and accordingly may fetch live media stream from the server.

The server is operable to store programs, such as pre-defined portions of live or almost live broadcast programs, and even Video On Demand programs. It is noted that due to storage limitations the server may not be able to store an infinite amount of live programs, thus a predefined amount of data corresponding to a predefined time period is stored and is refreshed in various manners. The server may include various media servers, hardware and software entities capable of storing and selectively retrieving multiple media packets and streams.

Whenever at least a portion of a program is received by the server the server is operable to generate a program associated data structure for allowing selective retrieval of portions of the stored program to emulate trick modes.

The video pump has multiple buffers, for storing multiple portions of media streams, and according to instructions provided by end users (such as PLAY, FF, REW and the like) provides the end user the requested media streams while requesting the server to provide consecutive portions of the media streams/or to provide a sequence of I-frames in accordance to the end-user's requests.

The video pump may further include a streamer, a retrieval unit and a processor. The retrieval unit is operable to fetch frames from a storage unit to the buffers, to evaluate the status of the buffers (especially the amount of free memory space) and accordingly fill the buffers. The streamer is operable to transmit frames, such as trick mode frames from the buffers and the processor is operable to access the frames stored within the buffers and to determine whether to alter timing information of stored frames and also determine how the streamer fetches and transmits frames from the buffers.

According to an embodiment of the invention the video pump is a Broadband Multimedia Router, such as the BMR 1200 of BigBand Networks Inc. the server and the BMR exchange Network File System (NFS) messages. The BMR requests data that is stored on the NFS server according to end-user requests and according to MPEG timing constraints, while the NFS server retrieves and stores media streams in an efficient manner. The BMR includes on the one hand an NFS client for exchanging information with the NFS server while on the other hand it includes a MPEG control unit for implementing the MPEG timing scheme.

The BMR may also include stream processors and multiplexers for performing re-multiplexing and PID re-stamping.

According to another aspect of the invention the server may introduce a slight delay during which program associated data structures may be generated almost on-the fly.

According to yet a further aspect of the invention the video pump interface is able to provide an end-user with a live media stream once a user has requested to receive a delayed media stream that is characterized by a negligible delay.

The invention provides a system, a method and a computer readable medium having code embodied therein that are operable to provide live media streams as well as trick play media streams. The generation and transmission of trick play media streams involves receiving and/or retrieving a media stream and analyzing it to provide metadata that will enable the selective retrieval of certain frames out of the normal play media stream and the generation of a trick play media stream on the fly without the need to store this stream. The trick play media stream includes the certain frames, whereas timing information related to the certain frames are modified according to the characteristics of the trick play media stream. According to another aspect of the invention the trick play media stream further includes concise duplicating frames.

The invention is also applicable for switching between a first trick play media stream to another trick play media stream or to the normal play media stream.

The method may be implemented by various hardware and/or software entities. Such an entity may include a server that includes both routing capabilities and video pump capabilities, but may include only a portion of said capabilities. Some of the hardware components may be connected to each other via a network, but this is not necessarily so, as both server and video pump may be integrated.

It is noted that the invention involves a reception (and storage) of a normal play media stream and does not require to generate or to store additional video streams that are encoded according to different presentation rate, thus simplifying the encoding process and reducing the memory consumption.

The invention provides a method for providing trick mode streams, as well as live media streams, the provision of the trick mode media streams includes the steps of: (a) receiving a request to change a display mode of a certain media stream; (b) fetching a media stream associated data structure associated with the certain media stream; and (c) processing the media stream associated data structure and in response providing a media stream that complies with the requested display mode.

According to an aspect of the invention the system and method allow an efficient Television On Demand Service. (TVoD).

BRIEF DESCRIPTION OF THE DRAWINGS

Further features and advantages of the invention will be apparent from the description below.

In order to understand the invention and to see how it may be carried out in practice, a preferred embodiment will now be described, by way of non-limiting example only, with reference to the accompanying drawings, in which.

DETAILED DESCRIPTION OF THE DRAWINGS

According to an embodiment of the invention the communication link between a media server and the video pump, as well as the media server are not utilized for providing live media streams. The media server can be either more cheap or provide more services than a media server that has to handle both live media streams and other media streams.

In prior art TVoD systems, when the video pump wants to supply a requested stream to an end-user, it has only one path through which it receives the stream. This is the network connection between the server and the video pump. This is true both in cases where the end-user wishes to view a live stream or when the end-user wishes to view a recorded stream. Therefore, every end-user viewing TVoD forces the creation of a new connection on the network between the server and the video pump. Furthermore, this connection requires the utilization of bandwidth of this network connection. This happens even if many end-users chose to view the exact same stream. In this case, the network would simply carry duplicate streams. Typically in TVoD cases, most of the viewers would chose to view the live version of a stream.

In very large systems this leads to a very high waste of bandwidth on the network and denies the possibility of passing other content between the server and the video pump.

The invention allows for reduced usage of bandwidth on the network. All the TVoD end-users viewing the live stream view a stream reaching the video pump only once on the first path. Only end-users which wish to view non-live streams require bandwidth utilization on the server-video pump connection during the time they are viewing the non-live streams.

In systems which serve large multitudes of end-users this is a massive decrease in the utilization of the network's bandwidth. This allows either deployment of networks with smaller bandwidths or utilization of freed up bandwidth for other services such as VoD.

Figure 1:
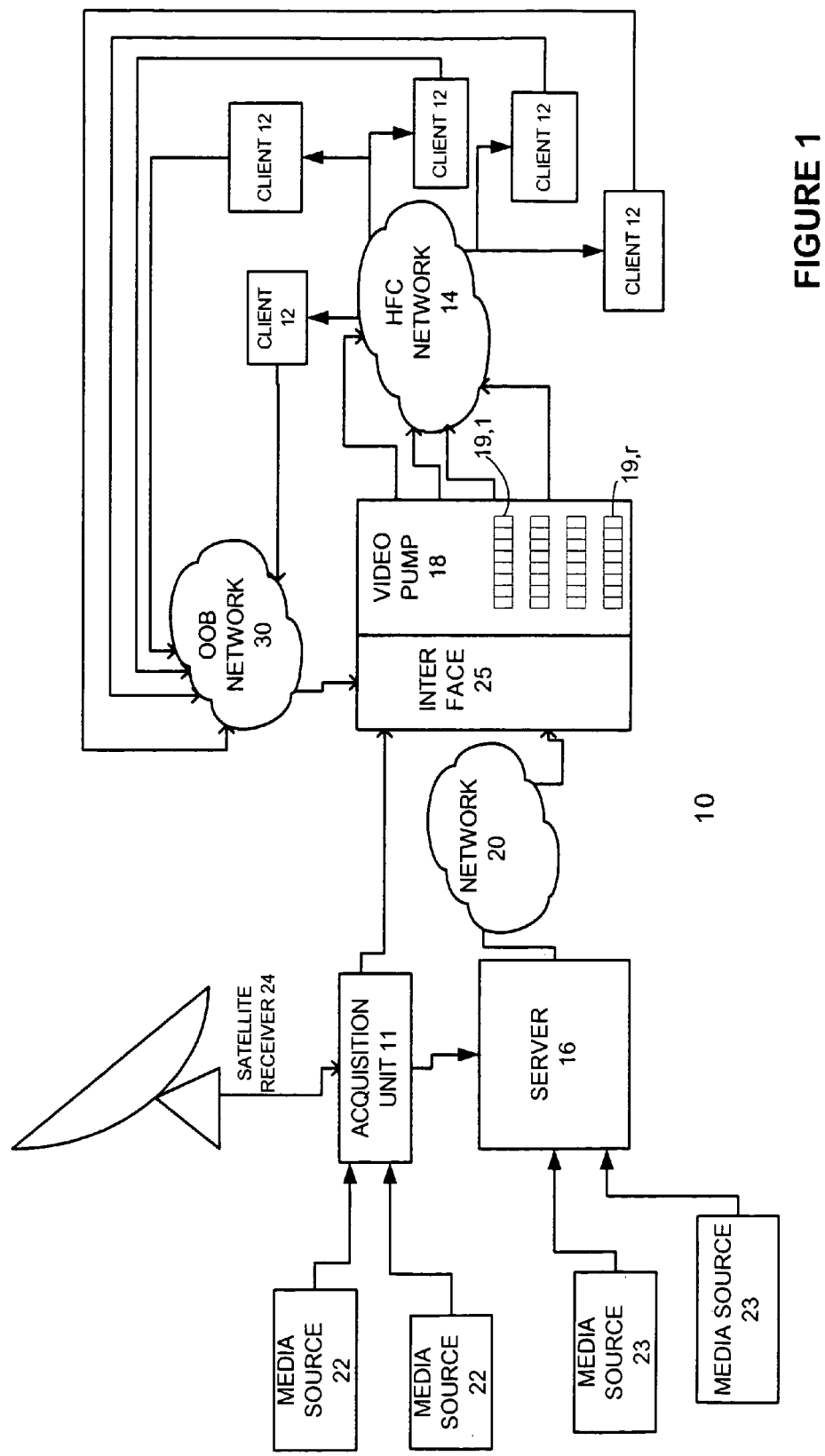
FIG. 1 illustrates a system for providing trick modes, and its environments, in accordance to an embodiment of the invention.

FIG. 1 illustrates system 10 for providing non-live media streams and live media streams, in accordance to an embodiment of the invention. In this context live media streams are media streams that are broadcast at substantially the same timing as they are received by the system. These are media streams that are not manipulated according to end users timing/trick play preferences, although they may be slightly delayed due to system internal delays, buffering situations and the like. A program that enters system 10 and especially acquisition unit 11 as a delayed program (in relation to its original broadcasting time or in relation to other system broadcast timing) is still regarded as a live stream throughout this specification.

System 10 is connected to multiple clients/end users 12 over a network, such as a broadband network and especially a Hybrid Fiber Cable (HFC) network 14. System 10 is operable to transmit media streams at a downstream direction to clients 12 and to receive requests and status information from clients 12 at an upstream direction. These requests may be transferred via a network other than HFC network 14, such as Out Of Band (OOB) network 30 that in turn includes a command channel. The requests may include requests to receive live media streams, to receive non-live media streams such as but not to limited to trick mode media streams.

System 10 includes: (A) Acquisition unit 11 that is connected to multiple media sources, such as but not limited to satellite receiver 24 and media sources 22. (B) Media storage and management entity such as server 16. (C) Video pump interface 25, connected to the output of acquisition unit 11, to server 16 and to a command channel of OOB network 30, the video pump interface 25 is operable to receive instructions/requests from end-users, such as clients 12, and accordingly to determine whether to feed video pump 18 with live stream media from the acquisition unit or to initiate a data fetch sequence for fetching data stored in the server, in case where non-live media streams are required; (iv) a video pump 18 that is operable to determine which data to fetch from the server and when to transmit it according to MPEG timing.

Once a client requests to receive a live media stream, video pump interface 25 provides him with a live media stream from acquisition unit 11, without substantially exchanging data and/or commands with server 16, thus it does not load server 16 or network 20.

Once a client requests to receive a media stream other than the live media streams provided by acquisition unit (referred to as non-live media stream, such as but not limited to Video On Demand media streams, delayed programs, trick mode video streams and the like) the video pump 18 is operable to access media related information and to process said data in order to enable the provision of non-live media streams to client 12. In the case of trick play media streams this information includes media stream associated data structures. The media stream associated data structures allow a determination of which frames of the normal play media stream to fetch from server 16 and when to transmit it according to MPEG timing. It is also able to fetch selected portions of the media stream stored at the server 16 such as to emulate trick modes, and is further operable to transmit the retrieved data over HFC network 14 to end users 12. Server 16 includes a processor 17 for processing normal play media streams and generating media stream associated data structures.

Server 16 may be coupled to multiple media sources 23, for receiving various types of video streams, such as Video On Demand video streams, or even receive live or almost live programs from media sources such as satellite receiver 24. Server 16 stores the received media streams for later retrieval.

Whenever a portion of a program is received by the server 16 it is operable to generate a media stream associated data structure, such as indexing file 100 of FIG. 2, for allowing selective retrieval of portions of the stored program to emulate trick modes.

It is noted that the location/configuration of video pump, video pump interface, server 16 may vary and they may be at least partially integrated or even located at remote locations. Although server 16 is referred as having an internal storage unit for storing media streams and additional information, this is not necessarily so and it may be also operable to access external databases (not shown).

FIGS. 2A-2D illustrate a normal play media stream 34, indexing file 100 and a two trick play media streams 200 and 300. It is noted that normal play media stream 34 and indexing file 100 are stored at the video pump and/or server while the trick play media streams are generated and transmitted by video pump 18 without a need to previously store them.

Figure 2A:
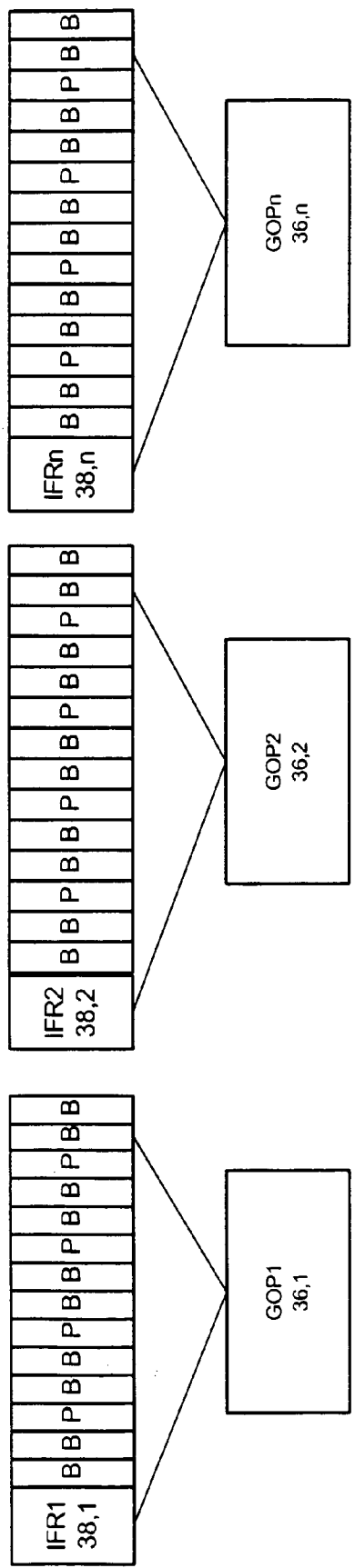
FIGS. 2A-2D, illustrate normal play media streams, trick mode media streams and media stream associated data structures, such as an indexing file, in accordance to embodiments of the invention.
Figure 2B:
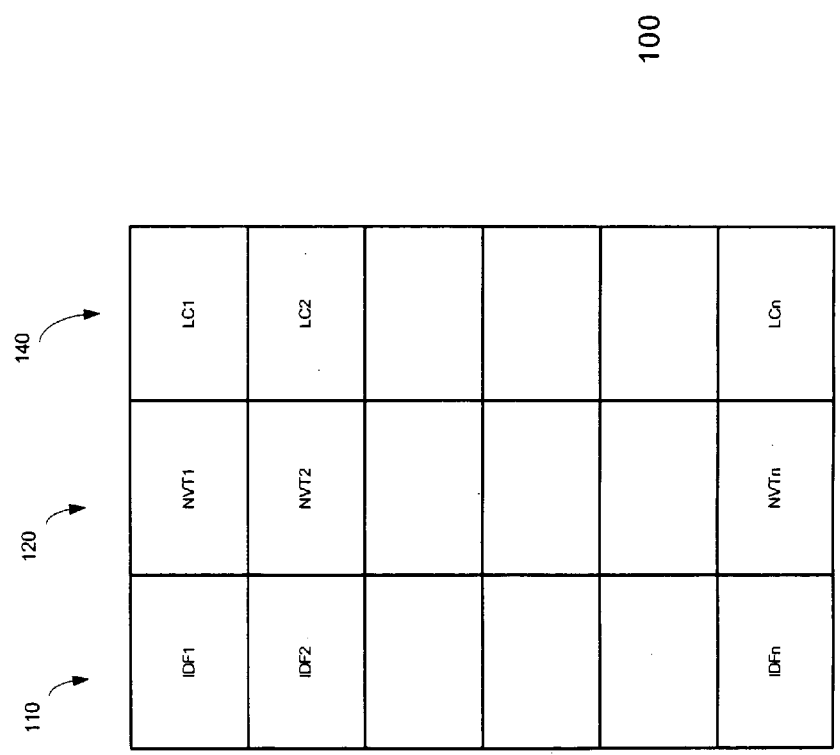
Figure 2C:
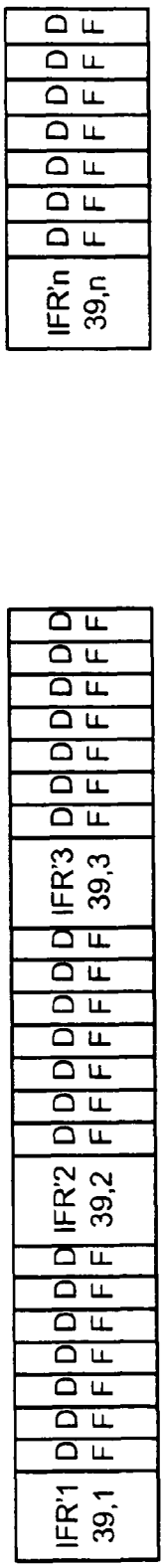
Figure 2D:
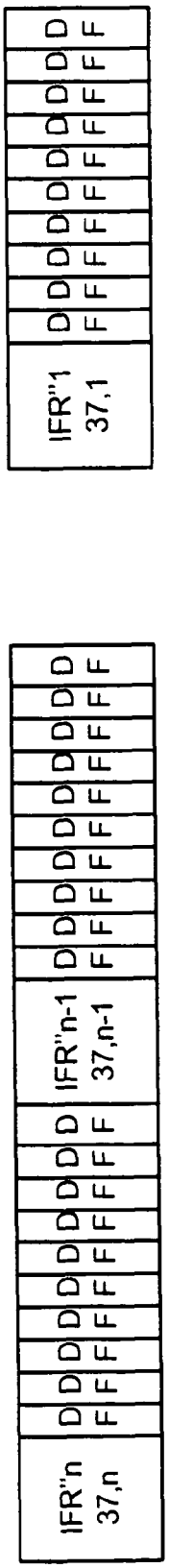

FIG. 2*a* illustrates a normal play media stream 34 that includes a sequence of Group Of Pictures (GOPs) GOP1-GOPn (denoted 36,1-36,*n*). Each GOP starts with an I-frame (38,1-38,*n*), and includes multiple P-frames and B-frames. FIG. 2*b* illustrates indexing file 100 that includes pointers to said I-frames. The order of pointers within indexing file 100 corresponds to the order of the corresponding I-frames within normal play media stream 34. It is noted that indexing file 100 may be generated without fully encoding the normal play media stream 34.

Each of first and second trick play media streams 200 and 300 is generated on-line, by selectively retrieving I-frames, modifying their timing information and transmitting the I-frames having the modified timing information to a user. Both media streams include I-frames and duplicating frames. The duplicating frames (DFs) are retrieved, associated with timing information and transmitted to a user, along with I-frames. First trick mode media stream 200 includes DF's and I-frames IRF'1-IFR'n 39,1-39,*n*. Second trick modes stream 300 includes DF's and I-frames IRF'''n-IFR''1 37,*n*-37,1. The I-frames of normal play media stream 34, first trick play media stream and second trick play media stream include the same visual content but have distinct timing information.

According to an aspect of the invention the indexing file 100 further includes at least one of the following parameters: the length of each I-frame, the starting point of each I-frame, the end point of each I-frame.

Trick mode media stream 200 differs from trick mode media stream 300 by the amount of DF inserted between each pair of I-frames (ten instead of seven), and by the reverse order of I-frames, as trick mode media stream is a fast forward media stream while trick mode media stream 300 is a slower rewind media stream. The amount of DF to be retrieved and transmitted between each pair of consecutive I-frames determine the presentation rate of the transmitted trick mode stream.

FIG. 2B illustrates indexing file 100, in accordance to an aspect of the invention. Indexing file 100 includes three rows 110-130. The first row 110 stores an I-frame identification information IDF1-IDFn. The second row 120 stores the I-frame normal play time value NVT1-NVTn. The third row 130 stores the location of the I-frame LC1-LCn. Optionally, indexing file may store either the location of a DF or may store the DF itself, as the DF is relatively concise. Most of these field values are retrieved from the normal play media stream.

According to yet another aspect of the invention facilitates multiple presentation rates by transmitting non-consecutive I-frames, whereas the time offset between the transmitted I-frames determines the presentation rate.

Video pump 18 and/or server 16 may have multiple buffers, 19,1-19,*r* for storing multiple portions of media streams, and/or media stream associated data structures, according to instructions provided by end users (such as PLAY, FF, REW and the like). Video pump 18 provides the end user the requested media streams while requesting the server to provide consecutive portions of the media streams/or to provide a sequence of I-frames in accordance to the end-user's requests.

Figure 3A:
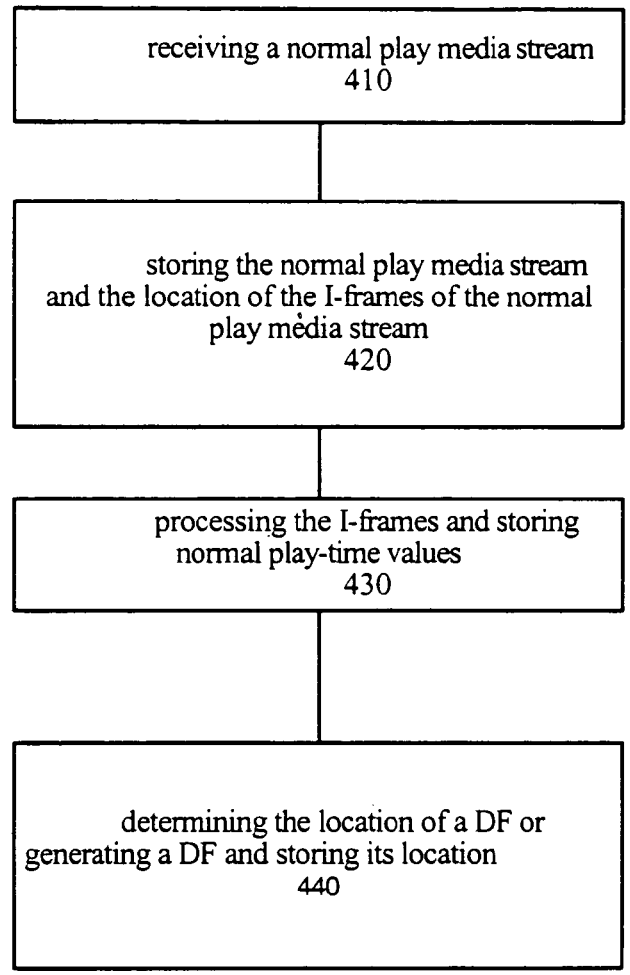
FIGS. 3A-3B illustrate methods for providing and transmitting trick play media streams, in accordance to embodiments of the invention.

FIG. 3A, illustrates method 400 for generating an indexing file. Method 400 includes the steps of: (i) step 410 of receiving a normal play media stream, (ii) step 420 of storing the normal play media stream and further storing the location of the I-frames of the normal play media stream. I-frames may be identified by the picture type information within the picture headers of the normal play video stream. An I-frame may also identified by locating the start of each GOP, in cases where each GOP has only that single I-frame.

Step 420 may be followed by step 430 of processing the I-frames and storing normal play-time values and locations. Step 430 may be followed by determining the location of a DF or generating a DF and storing its location.

Figure 3B:
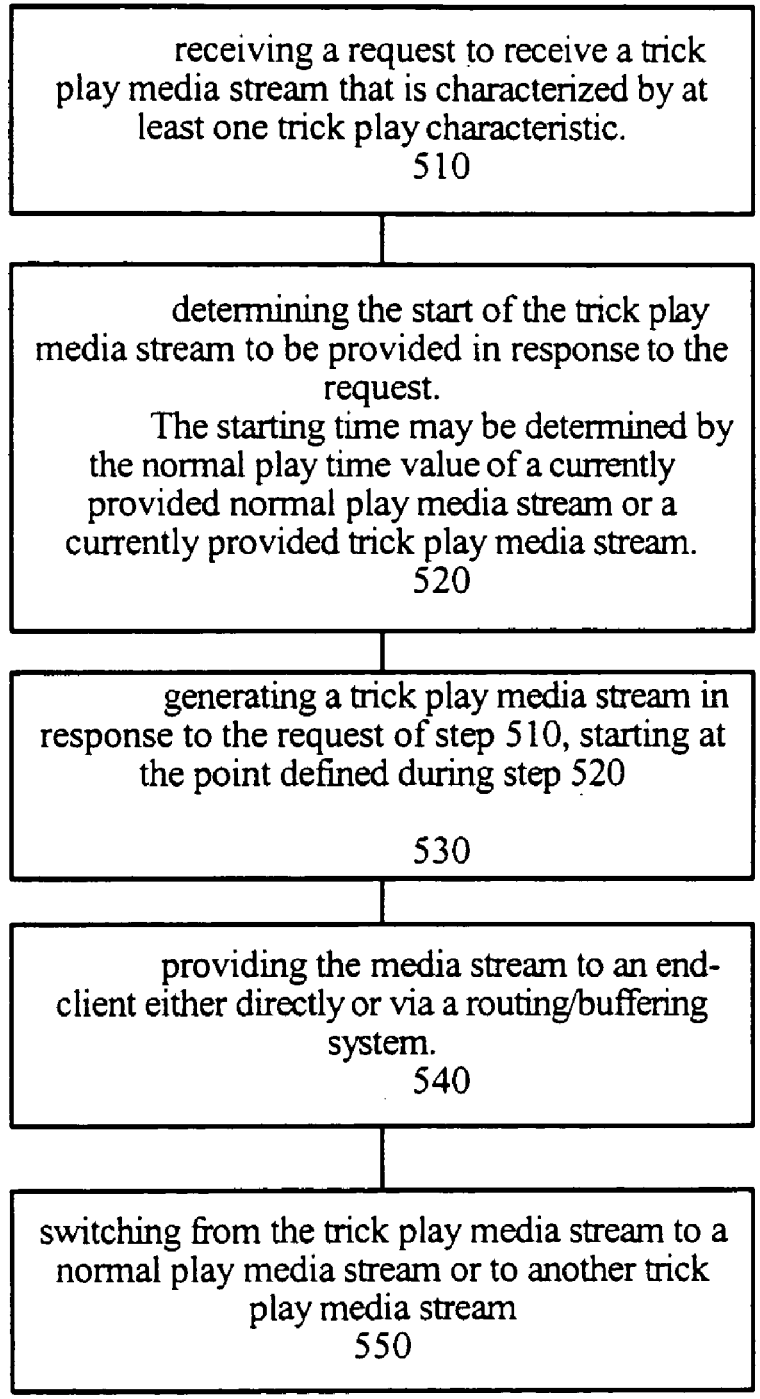

FIG. 3B illustrates method 500 for providing a trick play media stream. Method 500 comprising step 510 of receiving a request to receive a trick play media stream that is characterized by at least one trick play characteristic. This characteristic may define the type of trick play (FF, REW) and the speed (×2, ×4, ×20 and the like).

Step 510 is followed by step 520 of determining the start of the trick play media stream to be provided in response to the request. The starting time may be determined by the normal play time value of a currently provided normal play media stream or a currently provided trick play media stream.

Step 520 is followed by step 530 of generating a trick play media stream in response to the request of step 510, starting at the point defined during step 520. Step 530 usually includes step 532 of determining the amount of DF between each I-frame in response to the speed of the requested trick mode play and end-user characteristics, step 534 fetching I-frames from locations that are pointed to at indexing file, and step 536 of altering timing information of I-frames and of DF to provide a sequence of frames that form a trick play media stream.

Step 530 is followed by step 540 of providing the media stream to an end-client either directly or via a routing/buffering system.

It is noted that if DF are not present (according to another aspect of the invention) the trick play media stream may include only I-frames. In such a case the amount of I-frames repetition determines the trick play media stream rate.

Step 540 may be followed by step 550 of switching from the trick play media stream to a normal play media stream or to another trick play media stream. This is usually done by locating the normal play time values of the frames.

According to an embodiment of the invention video pump 18 is a Broadband Multimedia Router (BMR) such as one of the BMR family of BigBand Networks Inc., but this is not necessarily so. Some aspects of the Broadband Multimedia Router are illustrated at U.S. Pat. No. 6,434,141 of Oz et el, that is incorporated herein by reference.

The BMR may be connected to a server, such as server 16 of FIG. 1, and exchange various control messages, such as but not limited to Network File System (NFS) messages. It is noted that BMR may also be connected to a media server and/or server and exchange other types of control messages.

The BMR is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like.

The BMR is able to direct a variety of packet types, even when a packet does not include destination address information. The BMR may have a server client for interfacing with server 16 via network 20, and may further have multiple buffers (such as buffers 19,1-19,*r* of FIG. 1) for storing portions of media streams and/or trick play streams and/or media stream associated data structures.

According to a embodiment of the invention the BMR may participate in managing client requests. The BMR may request data stored in the server 16 in response to the request of an end user (normal mode, trick play mode) and MPEG timing constraints. The transmission of a trick play media stream will depend upon the timing information associated with its frames. Server 16 may store a normal play media stream as well as media stream associated data structures, such as indexing file 100. It is noted that the normal play media stream may be stored in a different device (such as a media source) than the media stream associated data structures.

The server 16 provides the requested portions that may be temporarily stored within BMR, multiplexed with other programs, re-multiplexed and PID re-stamped. An illustration of some of these functions is illustrated at U.S. Pat. No. 6,434,141 of Oz et el that is incorporated herein by reference. It is noted that BMR includes on the one hand a server compliant end user, such as end user 101 for exchanging information with the server 16 while on the other hand it includes various control and management units that ensure the transmission of MPEG compliant streams.

It is further noted that a processor capable of generating the media stream associated data structures may be located within server 16 or within BMR.

BMR is able to receive client requests to PLAY, FF, REW and the like and to switch between normal play media streams and trick modes by sending a request to server 16 to receive the requested stream and/or media stream associated data structure or by providing at least a portion of said stream, if it is already stored within one or more buffers out of $19,1$-$19,r$.

According to another embodiment of the invention the Headend manages client requests, and not the BMR. In such an embodiment the Headend will receive client requests and manage them. The Headend shall instruct server 16 which media streams to provide to the BMR and when to provide them. The BMR will detect that a media stream is provided to it and will direct the media stream to a client in response to at least one characteristic of the media stream.

Figure 4:
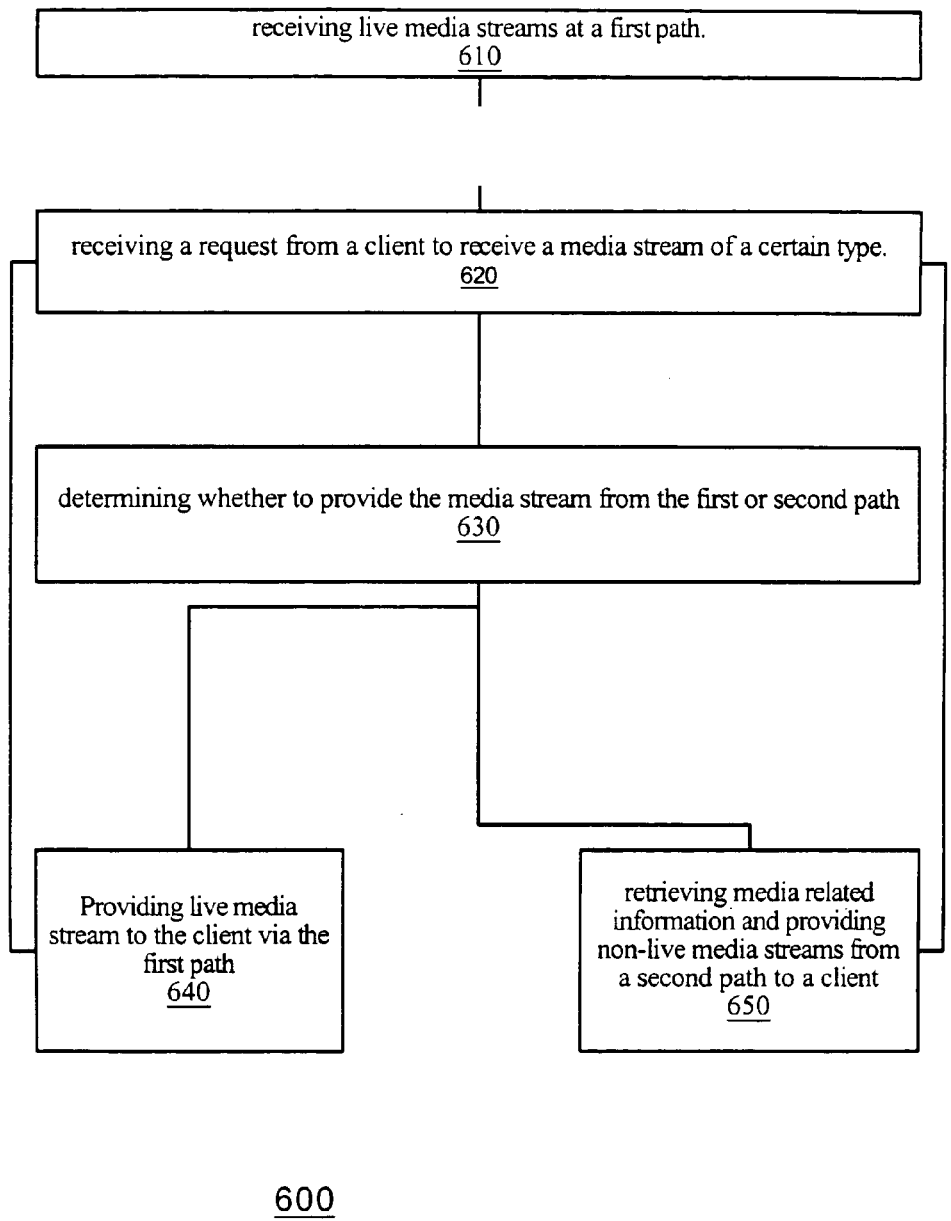
FIG. 4 illustrates a method for providing live media streams and other media streams, in accordance to an embodiment of the invention.

FIG. 4 illustrates method 600 for providing live media streams and other media streams, in accordance to an embodiment of the invention.

Method 600 starts by step 610 of receiving live media streams at a first path. Referring to FIG. 1, the first path includes acquisition unit 11 and any source such as satellite receiver 24 and/or media source 22. The first path may also include video pump 18, video pump interface 25 and HFC network 14.

Step 610 is followed by steps 620 of receiving a request from a client to receive a media stream of a certain type. The media stream can be a live media stream or anon-live media stream. Non-live media streams may include Video On Demand media streams, delayed streams, or trick mode streams. The non-live medias streams are provided by a second path that includes server 16 and may also include media sources 23, video pump 18, video pump interface 25 and HFC network 14. As illustrated by steps 630-650 method 600 may provide a client a requested media stream via first path or second path, in response to the mode of the requested media (live or not live), a delay associated with a requested delayed media stream, the load on server 16 or a link (such as network 20) that connects server 16 and video pump interface 25, and other factors.

Step 630 includes determining whether to provide the media stream from the first or second path. If the first path is selected a live media stream is provided to the client via the first path, as illustrated by step 640, else the media stream is provided via the second path, as illustrated by step 650.

Step 650 includes retrieving media related information and providing non-live media streams from a second path to a client. The media related information may include portions of the non-media stream, information indicative of the location of the stored non-live media program. The media related information may also include media stream associated data structure associated with the media stream. Media associated data structure may assist in constructing trick play media streams, as illustrated by FIGS. 2A-3B.

Steps 640 and 650 may be followed by step 620, for responding to another request, as method 600 is adapted to handle multiple clients. It is noted that method 600 may establish a session for each request from a client, especially when a non-live media stream is requested.

It is further noted in the context of method 600 that the live media streams may be also provided to the second path for generating non-live media streams, such as delayed media streams, trick mode media streams and the like.

It will thus be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

We claim:

1. A method for providing media streams, the method comprising the steps of:
    receiving live media streams at a first path, wherein the first path comprises a video pump coupled to a data acquisition unit;
    providing a live media stream from the first path to a client, in response to a request to provide the live media stream to the client;
    retrieving media related information that comprises data structures that assist in constructing non-live media streams;
    online generating by the video pump, in response to a request to receive a trick play media stream, a non-live media stream, by utilizing the media related information, wherein the generating comprises fetching intra-coded frames from locations that are pointed to at the media related information, and altering timing information of the intra-coded frames and of duplicating frames; and
    providing the non-live media stream from a second path to the client, wherein the second path comprises the video pump and a media server being coupled to each other by a network link that differs from a network link of the first path.

2. The method of claim 1 comprising providing the live media stream to multiple users wherein the live media stream reaches the video pump only once.

3. The method of claim 1 wherein the media related information comprises information indicative of a location of a stored media stream and wherein the generating of a non-live media stream further comprises a determination of which frames of the stored media stream to fetch from the first path.

4. The method of claim 1 wherein the data structures comprise an indexing file that comprises a duplicating frame and locations of the intra-coded frames.

5. The method of claim 1 wherein the non-live media stream is a trick mode media stream and wherein the non-live media stream consists essentially of the intra-coded frames and the duplicating frames.

6. The method of claim 1 further comprising a step of providing a live media stream from the first path to a client, in response to a request to provide a slightly delayed media stream to the client.

7. The method of claim 1 wherein an amount of duplicating frames to be transmitted between each pair of intra-coded frames determines a presentation rate of the non-live media stream.

8. A system for providing media streams, the system comprising:
a first path comprising a video pump coupled to a data acquisition unit; wherein the first path is utilized for receiving live media streams and for providing a live media stream to a client, in response to a request to provide the live media stream to the client; and
a second path comprising the video pump and a media server being coupled to each other by a network link that differs from a network link of the first path; wherein the second path is operable to retrieve media related information that comprises data structures that assist in constructing non-live media streams; to online generate at least a portion of a non-live media stream in response to a request to provide the non-live media stream to the client, by utilizing the media related information, wherein the generating comprises fetching intra-coded frames from locations that are pointed to at the media related information, and altering timing information of the intra-coded frames and of duplicating frames; and to provide the non-live media stream to the client, in response to the request to provide the non-live media stream to the client.

9. The system of claim 8 wherein the video pump is arranged to provide the live media stream to multiple users wherein the live media stream reaches the video pump only once.

10. The system of claim 8 wherein the first path comprises the video pump.

11. The system of claim 8 wherein the data structures comprise an indexing file that comprises a duplicating frame and locations of the intra-coded frames.

12. The system of claim 8 wherein and wherein the non-live media stream consists essentially of the intra-coded frames and the duplicating frames.

13. The system of claim 8 wherein the first path is further operable to provide live media stream, in response to a request to provide a slightly delayed media stream to the client.

14. A system for providing media streams, the system comprising:
an acquisition unit coupled to a media source;
a media storage and management entity;
a video pump interface, coupled to the output of the acquisition unit via a first path, to the media storage and management entity via a second path and to a command channel, the video pump interface is operable to receive instructions/requests from an end-user and accordingly to determine whether to feed the video pump with live stream media from the acquisition unit via the first path or to initiate a data fetch sequence for fetching data stored in the media storage and management entity, via the second path, in case where trick modes are required; wherein the second path comprises a network link that differs from a network link of the first path; and
a video pump that is operable to determine which data to fetch from the media storage and management entity and when to transmit it according to MPEG timing; wherein the video pump is arranged to provide the live media stream to multiple users wherein the live media stream reaches the video pump only once;
wherein the media storage and the management entity are adapted to generate at least a portion of a non-live media stream in response to a request to provide the non-live media stream to a client.

15. The system of claim 14 wherein the video pump is operable to fetch selected portions of the data stored at the media storage and management entity, wherein video pump is arranged to fetch selected portions based on an indexing file that comprises a duplicating frame and locations of the intra-coded frames.

16. The system of claim 14 wherein an amount of duplicating frames to be transmitted between each pair of intra-coded frames determines a presentation rate of the non-live media stream.

17. A non-transitory computer readable medium having code embodied therein for causing an electronic device to perform the steps of:
receiving live media streams at a first path, wherein the first path comprises a video pump coupled to a data acquisition unit;
providing a live media stream from the first path to a client, in response to a request to provide the live media stream to the client;
retrieving media related information that comprises data structures that assist in constructing non-live media streams;
online generating by the video pump, in response to a request to receive a trick play media stream, a non-live media stream, by utilizing the media related information, wherein the generating comprises fetching intra-coded frames from locations that are pointed to at the media related information, and altering timing information of the intra-coded frames and of duplicating frames; and
providing the non-live media stream from a second path to the client, wherein the second path comprises the video pump and a media server being coupled to each other by a network link that differs from a network link of the first path.

18. The method of claim 1, wherein the generating comprises generating at least the portion of the non-live media stream by converting the live media stream to provide at least the portion of the non-live media stream.

19. The method of claim 1, wherein the receiving further comprises receiving a live media stream from a first media source, and wherein the retrieving comprises retrieving media related information from a second media source that is different from the first media source.

20. The method of claim 2, further comprising storing non-live media streams at the video pump, providing a first portion of the non-live media stream from the video pump to the client, and providing a second portion of the non-live media stream from the media server, wherein the generating comprises generating the second portion of the non-live media stream.

21. The method of claim 7, wherein the converting comprises converting a live media stream to a non-live media stream that substantially includes intra coded frames of the live media stream and duplicating frames.

22. The system of claim 8, wherein the second path is further operable to generate at least the portion of the non-live media stream by converting the live media stream to provide at least the portion of the non-live media stream.

23. The system of claim 8, wherein the first path is operable to receive a live media stream from a first media source, and wherein the second path is further operable to retrieve media related information from a second media source that is different from the first media source.

24. The system of claim 14, wherein the video pump is further adapted to store non-live media streams, to provide a first portion of a non-live media stream that is stored at the video pump to the client, and to providing a second portion of the non-live media stream from the media storage and management entity, wherein the media storage and management entity is adapted to generate the second portion of the non-live media stream.

25. The system of claim 14, wherein the media storage and the management entity are adapted to convert a live media stream to a non-live media stream that substantially includes the intra coded frames of at least a portion of the live media stream, and duplicating frames.

26. The method according to claim 1 wherein the first path comprises the video pump.

* * * * *